Aug. 13, 1935.  H. E. VON SEGGERN ET AL  2,011,094
COOLING APPARATUS
Filed June 29, 1932   5 Sheets-Sheet 2

Inventors
HENRY E. VON SEGGERN
ERNEST A. VON SEGGERN
A. B. Bowman
Attorney

Aug. 13, 1935.  H. E. VON SEGGERN ET AL  2,011,094
COOLING APPARATUS
Filed June 29, 1932   5 Sheets-Sheet 4

Inventors
HENRY E. VON SEGGERN
ERNEST A. VON SEGGERN
By A. B. Bowman
Attorney

Patented Aug. 13, 1935

2,011,094

UNITED STATES PATENT OFFICE 2,011,094

COOLING APPARATUS

Henry E. von Seggern and Ernest A. von Seggern, Escondido, Calif.

Application June 29, 1932, Serial No. 619,897

11 Claims. (Cl. 62—115)

Our invention relates to cooling apparatus, and the objects of our invention are:

First, to provide an apparatus which is particularly suited for cooling milk but which is equally applicable for the cooling of other liquids;

Second, to provide an apparatus of this class which may be arranged in a single compact self-contained portable unit capable of being completely assembled at the factory;

Third, to provide an apparatus of this class which is particularly easy to operate requiring little or no attention;

Fourth, to provide an apparatus of this class in which the chilling portion is automatically drained of its heat absorbing medium or mediums when the apparatus is stopped, thereby enabling the chilling portion to be sterilized with live steam yet requiring only a minimum amount of such steam;

Fifth, to provide an apparatus of this class which when the apparatus is not in operation the entire system is at room temperature, thereby providing an apparatus having no wasteful heat leakage during its idle period;

Sixth, to provide an apparatus of this class which need be in operation only during the period in which the apparatus is actually cooling the liquid, said apparatus requiring but a few moments to change its system from an idle condition to an operative condition, or vice versa, thus providing an apparatus in which its cooling capacity is directly proportional to its actual operating time;

Seventh, to provide an apparatus in which the application of excessive temperatures to the chilling portion drives the refrigerant into a storage space rather than materially increasing the pressure, thereby providing an apparatus in which the parts need only be constructed strong enough to withstand normal operating conditions;

Eighth, to provide an apparatus of this class which incorporates a novel means of separating the dry or gaseous refrigerant from the liquid refrigerant yet enabling the lubricating oil within the system to be carried with the gas refrigerant to the compressor; and Ninth, to provide on the whole a novelly constructed cooling apparatus which is durable, efficient in its action, and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Similar characters of reference refer to similar parts and portions throughout the several views of the drawings.

Casing 1, water cooler pan 2, down spouts 3, distributer troughs 4, grid members 5, water spreading plates 6, collector 7, partition 8, water storage tank 9, pipe line 10, water pump 11, motor 12, fan 13, pulley 14, belt 15, compressor 16, bracket 17, water outlet pipe 18, pipe line 19, water inlet pipe 20, pipe line 21, connecting member 22, side plates 23, baffle members 24, refrigerant discharge pipe 25, cover members 26, refrigerant inlet pipe 27, evaporator tubes 28, covering 29, distributing trough 30, collector trough 31, separator housing 32, baffle 33, valve 34, float 35, drain plate 36, gas outlet tube 37, oil collector pan 38, equalizer pipe 39, pipe line (between equalizer pipe and storage tank) 40, storage tank 41, pipe line (between separator housing and receiver) 42, liquid refrigerant receiver 43, pipe line (between receiver and coil) 44, refrigerant cooling coil 45, tube (between separator housing and valve) 46, valve casing 47, flexible partition 48, pipe line (between valve and compressor intake) 49, valve 50, link member 51, sleeve 52, spring 53, control shaft 54, spring 55, equalizer valve 56, pipe line (between valve and compressor outlet) 57, drying coil 58, valve operating cam 59, valve and switch operating shaft 60, switch 61, switch operating levers 62 and 63, armature 64, magnet 65, switch 66, rod 67, control float 68, syphon overflow pipe 69, water supply line 70, valve 71, and float 72, constitute the principal parts and portions of our cooling apparatus.

The various elements of our apparatus, with the exception of the cooling or chilling unit, are contained within a rectangular casing 1. One of the important elements within the casing is a water cooling unit A, which is illustrated in Figs. 1, 2, 11 and 12. The water cooling unit extends the width of the casing and is disposed somewhat rearwardly of its central portion and closer to the top of the casing than the bottom.

Figure 11:
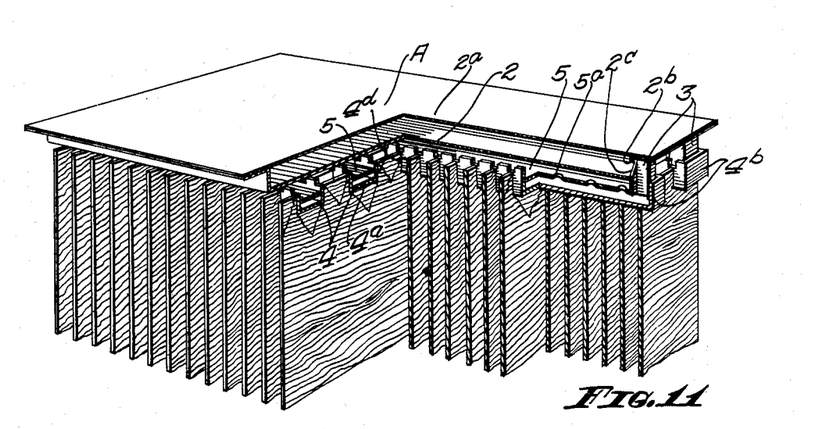
Fig. 11 is a fragmentary perspective view of the water cooling unit.
Figure 12:
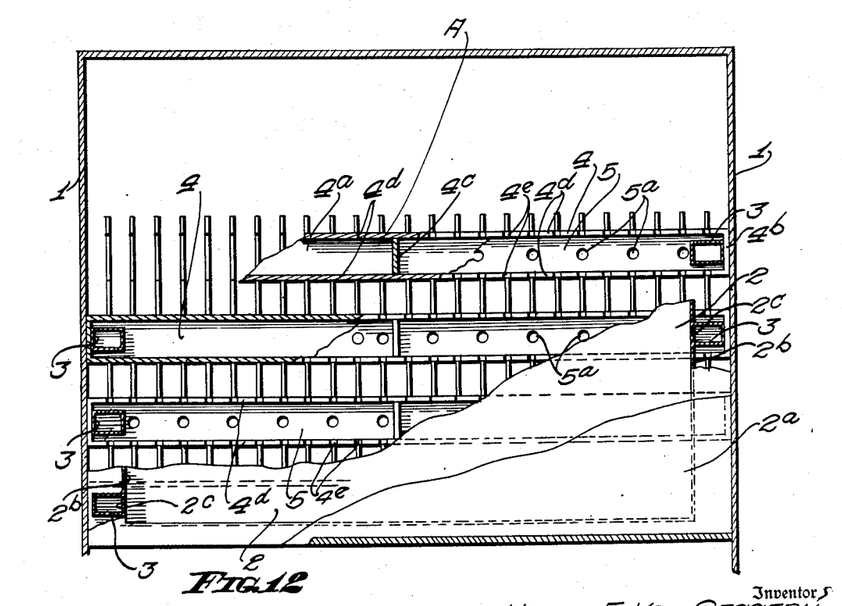
Fig. 12 is a plan view thereof with parts and portions broken away and in section and also showing the relation of the water cooler with the casing in which it is mounted.
Figure 13:
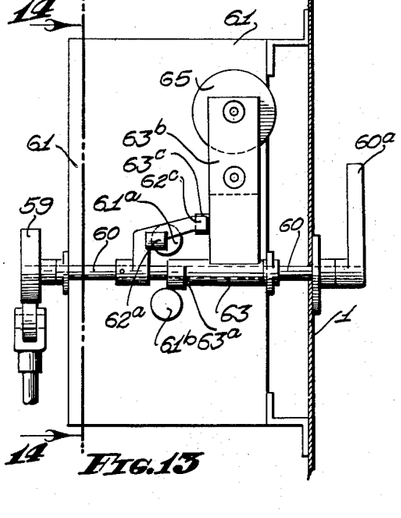
Fig. 13 is a sectional view through 13—13 of Fig. 2 showing the construction of the switch controlling mechanism with the switch shown in outline.

This water cooling unit includes a shallow rectangular pan 2 at its upper end which extends substantially the width of the casing and is provided with a suitable cover plate 2a thereby forming a shallow rectangular chamber. The end walls, designated 2b, of the pan which are disposed adjacent the sides of the casing 1 are provided with down spouts 3 which communicate with the pan 2 through apertures 2c. The apertures and down spouts in each end wall 2b are paired with corresponding apertures and down spouts in the other end wall.

Each pair of spouts extend into a distributer trough 4, one spout at each end of said distributer trough. A series of these troughs are provided and are disposed adjacent the under side of the pan 2 in spaced parallel relation with each other. Thus each distributer trough is elongated and comprises a bottom member 4a, end walls 4b, a centrally disposed dividing wall 4c, and side walls 4d. Each half of the distributer trough is provided with a grid member 5 which extends between the dividing wall 4c and an end wall 4b so as to divide the trough horizontally. The spouts 3 extend below the grids 5 so that water from the spouts flows into the troughs underneath said grids. The grids 5 are provided with a plurality of openings 5a which allow water to upwell into the upper portion of the distributer troughs.

The side walls 4d of the distributer troughs are provided with a plurality of notches 4e cut therein from their upper margins. The notches 4e of the several distributer troughs are arranged in rows extending transversely with respect to the troughs, that is, forwardly and backwardly with respect to the casing 1. A water spreading plate 6 is provided for each row of notches 4e. Each plate 6 is provided with a series of recesses 6a in its upper edge which receive the troughs 4, the spreading plates being positioned vertically. The recesses 6a are of such depth that the upper edges of the water spreading plates are substantially flush with the notches 4e. Also it should be noted that the water spreading plates are somewhat thinner than the width of the notches 4e so that said notches extend laterally beyond the surfaces of the water spreading plates.

The lower ends of the water distributing plates 6 overhang a collector 7 which is in the form of a shallow funnel extending between the side walls of the casing 1 and from the forward edges of the water spreading or distributing plates to the rear wall of said casing. The forward upper side of the water cooler pan 2, or rather its cover 2a, is connected to a partition 8 which is connected to the side walls of the casing and the upper wall thereof. The collector 7 and partition 8 divide the casing 1 in such a manner that air in order to pass from one side to the other of the water cooling unit must pass between the water distributing or spreading plates 6. The casing 1 is provided with an air outlet 1a disposed above the water cooling unit or rearwardly of the partition 8.

The water cooler operates as follows: Water flows from the pan 2 down through the spouts 3 and into the distributer troughs 4 below the grids 5 and overflows the several notches 4e. Whereupon the multiplicity of small streams flowing out the notches 4e divide and flow down opposite sides of the water spreading plates 6. It has been found that thin strips of wood form the best material for the construction of the water spreading plates. The wood is arranged with the grain running horizontally, that is, transversely to the direction of water flow. The streams of water pouring on to the spreading plates tend to flow laterally along the grain of the wood and thereby spread out and join each other thus forming films of water covering the surfaces of the spreading plates so that air flowing between the several spreading plates causes some of the water from the surface of the films to evaporate and thereby cool the remaining water which drains into the collector 7.

The collector 7 is provided with a neck 7a which directs water into a storage tank 9 disposed underneath and to one side of the water cooler unit. The storage tank is large enough to hold the entire quantity of water used in the water circulating system of the apparatus.

The water storage tank 9 is connected by a pipe line 10 to the intake side of a centrifugal water pump 11 which is driven by a motor 12, preferably an electric motor. The motor is disposed below and forwardly of the water cooling unit with the pump at the rear side thereof. The forward side of the motor supports a fan 13 which is arranged adjacent the forward side of the casing 1 in registry with an inlet opening 1b therein. The fan 13 causes a current of air to pass through the water cooling unit and out of the outlet opening 1a.

Between the motor and water pump there is provided a pulley 14 which is connected by a belt 15 to the driving means of a compressor 16 mounted above the motor 12 in front of the water cooling unit.

A vertically extending bracket 17 is secured to one outer side of the casing 1 and extends vertically downwardly from the upper edge thereof. At its upper portion the bracket supports a horizontal outwardly extending water outlet pipe 18 which is joined by a pipe line 19 to a water jacket 16a associated with the compressor 16. The bracket 17 supports a water inlet pipe 20 at its central portion. Said inlet pipe extends horizontally outwardly in parallel disposed alined relation with the water outlet pipe 18. The water inlet pipe 20 is joined by a pipe line 21 to the discharge side of the pump 11. The water inlet pipe 20 and water outlet pipe 18 are joined by their extended ends to a connecting member 22.

A pair of side plates 23 join the water outlet pipe 18 and water inlet pipe 20 as well as the connecting member 22 and bracket 17. The side plates 23 are arranged in parallel spaced relation with each other and are separated a distance somewhat less than the diameters of the inlet and outlet pipes thereby forming a flat recessed panel with upper and lower rims formed by the water inlet and outlet pipes and side rims formed by the connecting member 22 and bracket 17. Within the space formed by the side plates 23 there is provided a series of baffle members 24 which cause water to circulate back and forth between the side plates 23 in order to pass from the water inlet pipe 20 to the water outlet pipe 18, there being provided openings 20a and 18a in the pipes 20 and 18, respectively, which communicate with the interior of the panel formed by the side plates 23.

The bracket 17 also supports a refrigerant discharge pipe 25 which extends horizontally therefrom in contiguous relation with the water inlet pipe 20 and is joined to the connecting member 22. The recesses formed by reason of the adjacent relation of the water inlet pipe 20 and refrigerant discharge pipe 25 are bridged by cover members 26.

A refrigerant inlet pipe 27 extends from the lower portion of the bracket 17 and is arranged in parallel alined relation with the other pipes supported by said bracket. The refrigerant discharge pipe 25 and the inlet pipe 27 are connected by a plurality of vertically arranged evaporator tubes 28. These tubes are rectangular in cross section and are positioned contiguous to each other so that their exposed sides together form two surfaces of a recessed panel bounded by the pipes 25 and 27 and by the connecting member 22 and bracket 17. The exposed surfaces of the evaporator tubes are provided with a metallic covering 29 for the purpose of providing a smooth easily cleaned surface.

Figure 1:
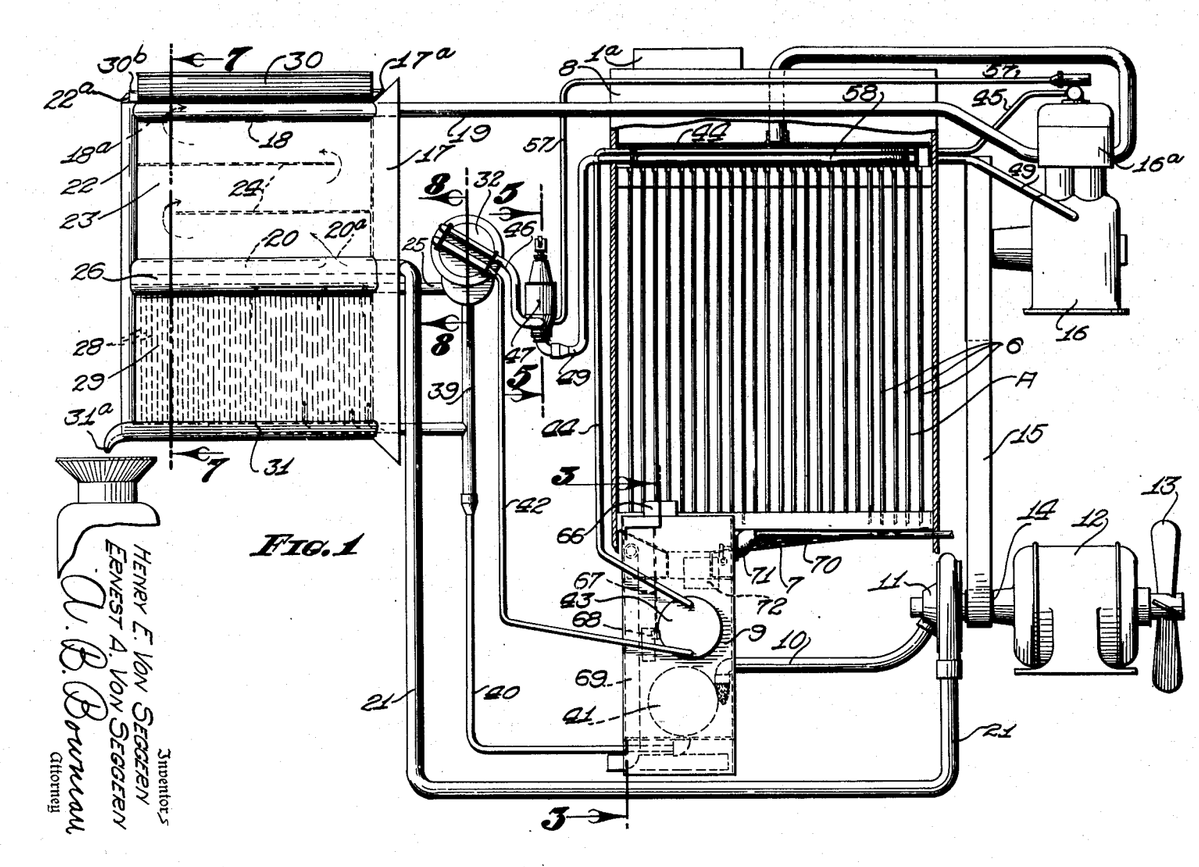
Figure 1 is a diagrammatical view of our cooling apparatus.

A distributing trough 30 is mounted above the water outlet pipe 18. This trough is substantially semi-cylindrical in cross section and is provided with discharge openings 30a along its bottom directly over the water outlet pipe 18. The ends of the trough are closed and are provided with projections 30b arranged in pairs so as to straddle lugs 22a and 17a extending upwardly from the connecting member 22 and bracket 17. The refrigerant inlet pipe 27 rests in a substantially semi-cylindrical collector trough 31 which is closed at its end adjacent the bracket 17 and is provided with a spout 31a at its extended end, as shown in Fig. 1. The connections between the several pipes of the chilling unit and the upper and lower panels thereof and the collector trough are rounded or made as smooth as possible so as to eliminate all corners or crevices where bacteria might lodge and to otherwise provide a surface which may be readily and quickly cleaned and sterilized.

The refrigerant discharge pipe 25 extends into the casing 1 and into a separator housing 32, illustrated in Figs. 1, 2, 8 and 9. The discharge pipe 25 intersects the separator housing 32 near the bottom thereof and adjacent one end, designated 32a. The separator housing 32 extends horizontally and is provided with a baffle 33 which is disposed adjacent the end 32a but spaced therefrom so that the refrigerant discharge pipe 25 is between the baffle and end 32a. The baffle, therefore, divides the separator housing into a chamber B which is smaller and contains the end of the refrigerant discharge pipe 25, and a larger chamber C formed between the baffle 33 and the extended end 32b of the housing.

Figures 7, 8, 9, 10:
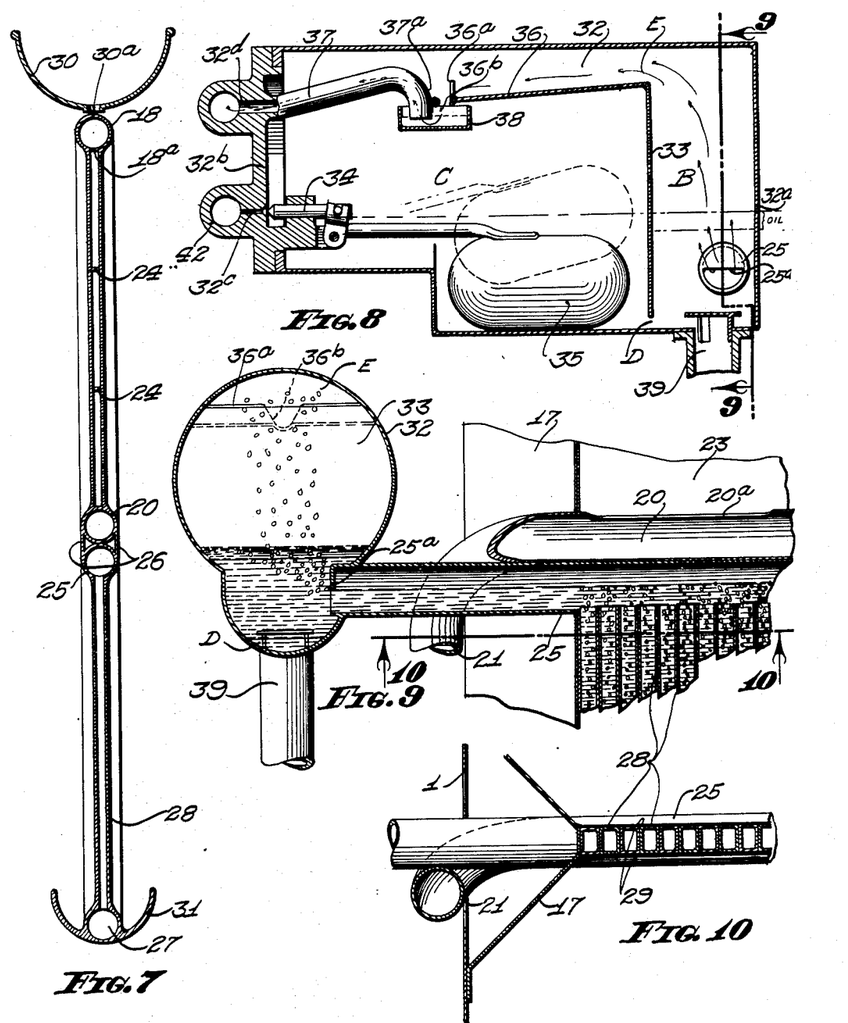
Fig. 7 is an enlarged sectional view through 7—7 of Fig. 1, showing the construction of the chilling unit.
Fig. 8 is an enlarged sectional view through 8—8 of Fig. 1 illustrating details of construction of the separator casing and associated mechanism.
Fig. 9 is a sectional view thereof through 9—9 of Fig. 8 showing adjacent portions of the chilling unit fragmentarily.
Fig. 10 is a sectional view thereof through 10—10 of Fig. 9.

Said extended end 32b of the housing 32 is provided with a liquid refrigerant inlet port 32c which is controlled by a needle valve 34 adapted to be operated by a float 35.

The baffle 33 is spaced upwardly from the bottom of the housing 32 forming a passage D communicating between the chambers B and C. Also said baffle is spaced downwardly from the upper portion of the housing forming a passage E between said chambers. The upper margin of the baffle 33 is connected to a drain plate 36 which slopes downwardly slightly and extends into the chamber C of the housing. The lower or extended end of the drain plate 36 is provided with a low wall 36a intersected by a rudimentary spout 36b. The extended end of the housing 32 is provided with a gas outlet opening 32d which is connected to a gas outlet tube 37 adapted to extend into the housing adjacent the upper side thereof. The extended end of the outlet tube 37 is provided with a down turned portion 37a which supports a small oil collector pan 38 in such a manner that the receiving end of the tube 37 projects into the pan 38. The pan 38 is disposed so as to catch liquids which may drain down the plate 36, as shown best in Fig. 8.

The bottom of the chamber B of the housing 32 is connected to an equalizer pipe 39 which extends downwardly and joins the refrigerant inlet pipe 27. The equalizer pipe is connected at its lower end to a pipe line 40 which extends to a storage tank 41 disposed within the water storage tank 9. The storage tank 41 is large enough to receive all the liquid refrigerant contained in the system. Its function will be described more in detail hereinafter.

A pipe line 42 extends from the liquid refrigerant inlet port 32c of the separator housing to a liquid refrigerant receiver 43 which is in the form of a tank also mounted in the water tank 9 above the refrigerant storage tank 41. Another pipe line 44 leads from the receiver 43 through a cooling coil 45 disposed in the pan 2 of the water cooling unit to the discharge side of the compressor 16. A tube 46 communicates between the gas refrigerant outlet 32d and a valve casing 47. The valve casing 47 forms an upper chamber 47a and a lower chamber 47b separated by a flexible partition 48. The tube 46 extends horizontally into the side of the lower chamber 47b. The lower end of said chamber receives the end of a pipe line 49 which connects said chamber with the compressor intake. A drying coil 58 is provided intermediate the ends of the pipe line 49 and is disposed in the pan 2, its function being to evaporate such liquid particles of refrigerant as may be carried along by the gas from the evaporator, before it reaches the compressor. The end of the pipe line 49 extending into the end of the chamber 47b is provided with a valve seat 49a which is controlled by a valve 50 arranged to be shifted along a vertical axis. The valve 50 is connected through a link member 51 to a sleeve 52 which is supported in depending relation with the flexible partition 48. The link 51 is provided with a slide portion 51a which extends into the sleeve 52 and is held in an extended relation therewith by means of a spring 53.

Above the sleeve 52 within the upper chamber 47a there is provided a control shaft 54 which is joined to the sleeve and which protrudes from the upper end of the valve casing, the control shaft extending through a suitable adjusting means 47c. A spring 55 extends between the adjusting means 47c and the sleeve or flexible partition.

Figures 2, 3, 4, 5, 6:
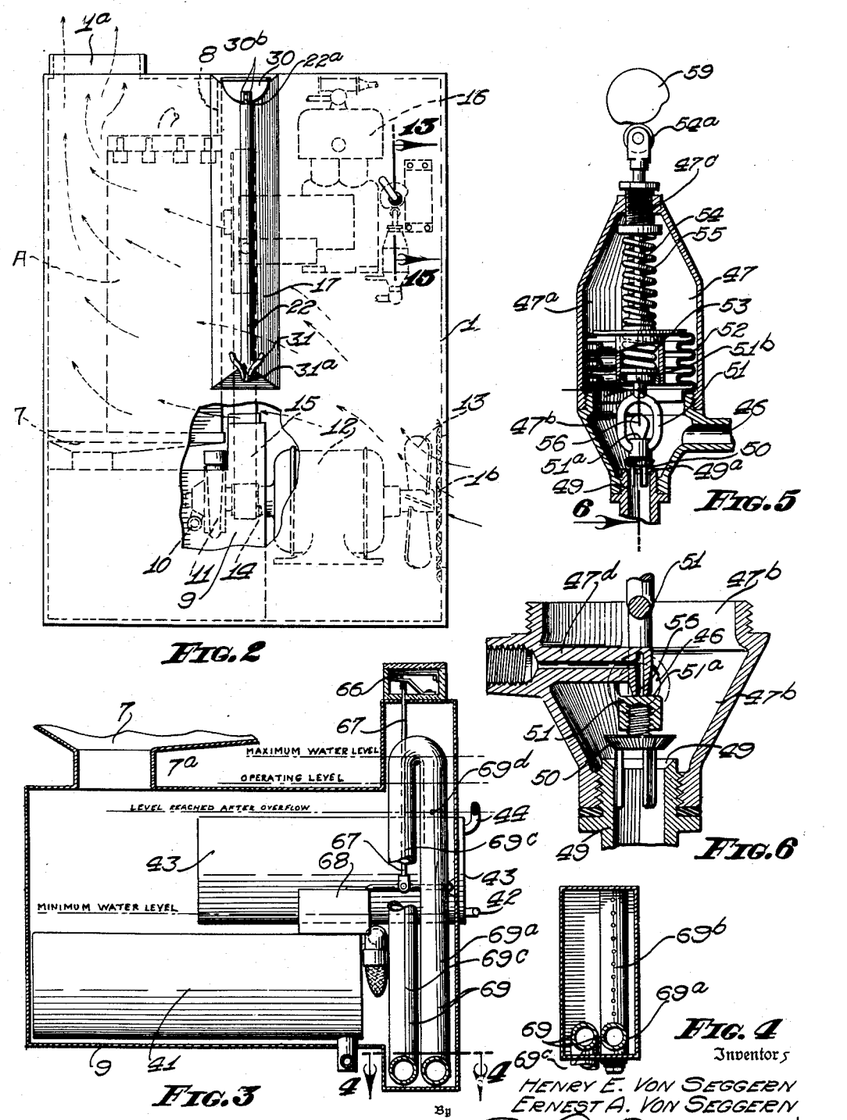
Fig. 2 is a side elevational view thereof.
Fig. 3 is a sectional view of the water storage tank with parts and portions shown in elevation to facilitate the illustration.
Fig. 4 is a fragmentary sectional view thereof through 4—4 of Fig. 3.
Fig. 5 is an enlarged sectional view of the control valve mechanism taken through 5—5 of Fig. 1.
Fig. 6 is a further enlarged sectional view thereof taken through 6—6 of Fig 5, with parts and portions shown in elevation.

The link 51 is in the form of a loop arranged so that the lower side of the opening therein forms a valve seat 51a, as shown in Figs. 5 and 6. A hollow arm 47d extends into the chamber 47b from one side thereof and is provided with a down turned extremity which forms an equalizer valve 56 adapted to extend into the opening provided in the link 51 and coact with the valve seat 51a. The equalizer valve 56 is connected by a pipe line 57 with the outlet side of the compressor 16.

The upper or exposed end of the control shaft 54 is provided with a roller 54a which is adapted to be engaged by a valve operating cam 59. The valve operating cam 59 is mounted on a shaft 60 which extends horizontally through a side of the casing 1, preferably the side having the chilling unit, and is provided with a suitable handle 60a. The shaft 60 extends along the side of an electric switch 61, which is shown in outline, except for a starting button 61a and a stopping button 61b arranged one above the other on opposite sides of the shaft 60. A pair of operating levers 62 and 63 are mounted upon the shaft 60. The operating lever 62 is provided with a lug 62a adapted to engage the starting button 61a and a lug 62b adapted to engage the stopping button 61b. The operating lever 62 is fixed to the shaft 60. The operating lever 63 is rotatable upon the shaft 60 and is provided with a lug 63a adapted to engage the stopping button 61b. An arm 63b extends from the lever in arcuate angular relation with the lug 63a. The arm 63b is provided with a projection 63c adapted to be engaged by an arm 62c extending from the lever 62. The extended end of the arm 63b supports an armature 64 which is adapted to be attracted to a magnet 65 mounted on the side of the switch 61. The magnet 65 is in a circuit with the power line to the switch which connects the motor 12.

Figure 14:
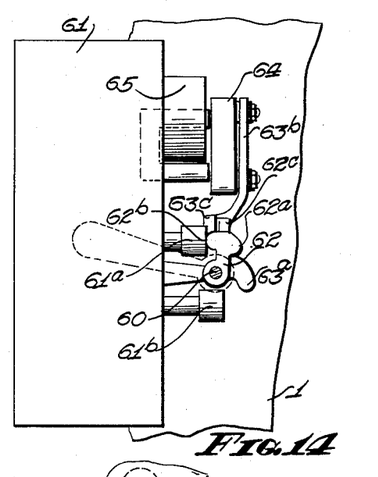
Fig. 14 is a sectional view thereof through 14—14 of Fig. 13 with the switch shown in outline.
Figure 15:
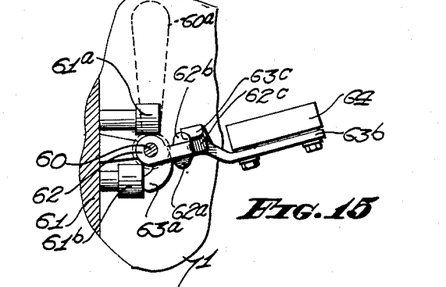
Fig. 15 is a similar sectional view showing the position of the parts when the switch is off upon being shifted to such position by the safety devices associated with the apparatus.
Figure 16:
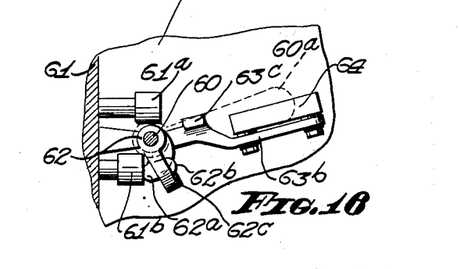
Fig. 16 is a similar sectional view showing the position of the parts when the apparatus is turned off manually.
Figure 17:
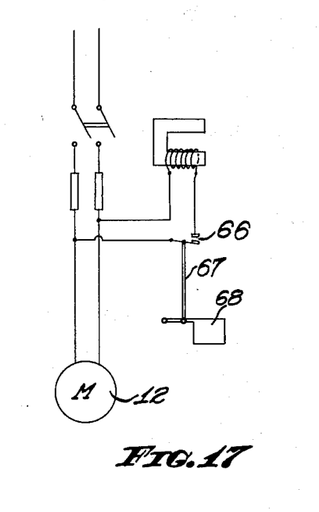
Fig. 17 is a wiring diagram of the electrically controlled or operated portions of the apparatus.

Inasmuch as our apparatus may often be operated where the water supply is uncertain, there is provided an automatic control means which shuts off the apparatus should the water supply fail. This function is accomplished by a safety switch 66 disposed in series with the magnet 65 and mounted on top of the water storage tank 9. The safety switch 66 is operated by a rod 67 which extends downwardly into the water storage tank 9 and is joined to a float 68. When water buoys the float 68 the switch 66 is closed. When the water falls below the safety level the float 68 drops and opens the switch 66. If this occurs, or the power supply is cut off, the magnet 65 no longer attracts the armature 64, whereupon the armature tends to fall from the position shown in Fig. 14 to the position shown in Fig. 15. In doing so it turns the handle 60a by reason of the connection between the projection 63c and the arm 62c. At the same time the lug 63a engages the stopping button 61b and thereby opens the switch 61. However, when the apparatus is closed by hand the lever 62 is moved beyond the position assumed when operated by the automatic action of the safety mechanism, that is, the levers 62 and 63 occupy the position shown in Fig. 16 rather than that shown in Fig. 15. This arrangement enables the operator to tell whether the apparatus has been shut off automatically due to failure of power supply or water supply or whether it has been shut off manually.

The cam 59 which is operated simultaneously with the opening or closing of the switch 61 is arranged so that when the switch 61 is open the valve 50 is in its closed position so as to seal the passage between the housing 32 and intake of the compressor 16 simultaneously opening the equalizer valve 56. At other times when the switch 61 is closed and the machine is in operation the valve 50 is open and the equalizer valve 56 is closed or open slightly so as to perform a function set forth in the description of the operation of our apparatus.

In order that the water in the system may be changed without undue attention there is provided a syphon overflow pipe 69 which is in the form of a U-shaped tube arranged in an inverted position. One leg 69a is provided at its lower extremity with a lateral inlet tube 69b having perforations therein. The other leg, designated 69c, is connected with a suitable means for discharging liquids. At a point somewhat below the normal operating level maintained in the storage tank the leg 69a is provided with a bleeder hole 69d. The water storage tank 9 is connected to a water supply pipe 70 through a valve 71 controlled by a float 72 arranged to maintain the water at a predetermined operating level above the bleeder hole 69d. When the apparatus is shut off the water in the various water pipes thereof drains into the storage tank raising the water level until it is above the syphon overflow pipe 69, whereupon a quantity of the water flows out until the level reaches that of the bleeder hole 69d, whereupon the water ceases to flow out and the water supply pipe 70 adds water to the storage tank until the operating level determined by the float 72 is reached. This water which is removed is drawn from the bottom of the storage tank 9 and carries with it a large percentage of the sediment which may collect. The water pump is located below the operating level of water in the tank so that it is at all times in a primed condition.

Operation of our cooling apparatus is as follows: When the apparatus is idle the valve 50 is closed and the refrigerant is at normal or room temperature. The storage tank 41 is made large enough to contain all the refrigerant in the entire system. Also when the apparatus is idle the water is entirely drained from the chilling unit, from the water cooler, and from practically all places above the water level in the storage tank 9.

When the handle 60a is turned the switch which controls the motor 12 and valve 50 are brought into operation simultaneously, whereupon the compressor reduces the pressure in the separator housing, evaporator tubes and equalizer pipe 39, and the liquid refrigerant flows from the storage tank 41, through the pipe 40, into the evaporator tubes 28, equalizer pipe 39, and separator housing 32, and likewise water circulates through its system. A small portion of the liquid refrigerant in the storage chamber evaporates forming a gas which, under the pressure occurring in the low side of the refrigerant circulating system (of which the storage chamber is a part), holds the liquid refrigerant entirely out of the storage chamber 41. The gaseous refrigerant which is drawn from the separator housing through the valve 50 is compressed by the compressor 16 and re-delivered to the pipe 42 through the refrigerant receiver 43. Whereupon the liquid refrigerant enters as needed into the separator housing. The float 35 which controls the entrance of the liquid refrigerant maintains the level of the liquid refrigerant somewhat above the level of the refrigerant discharge pipe 25. Hence the evaporator tubes 28 are maintained, under normal conditions, completely full of liquid refrigerant. The end of the discharge pipe 25 protruding into the housing 32 is provided with a partition 25a over its upper portion so as to form a pocket above the evaporator tubes into which the gaseous refrigerant may pass as it evolves or evaporates from the liquid refrigerant in the evaporator tubes.

In a refrigerant circulating system, such as the sulphur dioxide type, it is necessary that the compressor be lubricated with an oil or the like which passes with the refrigerant through the system. It is necessary that this oil be carried with the dry or gaseous refrigerant back to the compressor yet it is equally important to prevent liquid refrigerant from entering the low side of the compressor. With our apparatus the oil, being lighter than the liquid refrigerant, collects on top of the liquid refrigerant between the baffle 33 and end 32a of the separator housing. The gaseous refrigerant bubbles out of the discharge tube 25 and passes upwardly through the layer of oil. Upon doing so the bubbles become coated with a film of oil which they carry upwardly still in the form of bubbles over the top of the baffle 33. By this time the bubbles of gas coated with an oil film break depositing the oil upon the drain plate 36 where the oil flows into the pan 38 until the level of oil raises sufficiently to nearly close the down turned end portion 37a of the dry or gaseous refrigerant outlet tube 37, whereupon the oil is drawn with the gaseous refrigerant into the pipe 37 and is carried to the compressor.

Adjustment of the tension of the spring 55 carried by the valve casing 47 enables one to control the suction pressure of the compressor and thereby control the temperature in the refrigerating system. If the pressure falls below this predetermined amount the valve 50 moves a slight distance towards its seat, although not enough to impair the passage, causing the equalizer valve 56 to open and deliver some of the compressed, although unliquefied, refrigerant into the suction line which maintains the suction pressure to the desired point. It being here noted that the valve 56 is connected directly with the discharge end of the compressor and does not pass through the cooling coil 45.

The principal purpose of the valve 50 is to prevent a transfer of any refrigerant by evaporation and re-condensation from the storage tank 41 into the compressor when the machine is idle. However this condition only arises when the atmospheric temperature drops below that of the water bath in which the refrigerant storage tank is mounted, and consequently cools the compressor sufficiently to cause a transfer from the storage chamber to the compressor by evaporation and a subsequent condensation of the refrigerant in the compressor. By reason of the inter-relation of the valve 56, the valve 50, and the switch 61, one operation opens the valve 50, closes the valve 56, and closes the switch 61, thus enabling the apparatus to be started or stopped with one simple operation.

It requires but a few seconds after the machine is started to fill the evaporator tubes 28 with liquid refrigerant and the water circulating portion of the chilling unit with water so as to be in condition to receive the liquid substance to be cooled. Likewise, only a few seconds is required for the water to drain from the water circulating portion of the chilling unit and the liquid refrigerant from the refrigerated portion of the chilling unit. For this reason almost immediately after the apparatus is turned off live steam may be directed over the chilling unit so as to completely sterilize every part thereof. Furthermore, only a small quantity of such steam is necessary to raise the temperature of the chilling unit to a point necessary for sterilization. Even if the apparatus is in operation and an undue amount of heat is applied to the chilling unit the liquid refrigerant is merely driven back to the storage chamber and no undue pressure is created. This feature is particularly desirable for it enables the evaporator tubes to be constructed of thin material and still be rectangular in cross section so as to provide the most effective heat transfer area or surface possible.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a cooling apparatus, a water circulating means including, a heat absorbing element, a heat dissipating element, and a storage tank for collecting the water cooled by said heat dissipating element, a refrigerant circulating means including a heat absorbing unit, a separator for dividing the gaseous from the liquid refrigerant, a compressor for the gaseous refrigerant, a receiver for the compressed or liquid refrigerant disposed in said storage tank, said heat absorbing element and heat absorbing unit being relatively disposed so that a liquid to be cooled passes first over said heat absorbing element then over said heat absorbing unit, and a refrigerant storage receptacle capable of holding a quantity of refrigerant sufficient to supply said refrigerant circulating means, said storage receptacle connected with said separator independently of said receiver.

2. In a cooling apparatus, a dual circulating means comprising a first portion arranged to circulate a first cooling medium and a second portion arranged to circulate a second cooling medium, said cooling mediums of such character as to absorb heat within adjacent ranges of temperature, a heat absorber incorporated in each portion, an exchanger common to said portions for transferring accumulated heat from said second cooling medium to said first cooling medium, and a heat dissipating means incorporated in said first cooling medium, a first storage tank for said first cooling medium disposed in the path of circulation thereof, a second storage tank for said second cooling medium forming a blind end out of the path of circulation of said second cooling medium, and disposed so that the liquefied portion of said second cooling medium is forced therein by pressure created upon evaporation of a portion of said second medium when said circulating means is stopped.

3. In a cooling apparatus, a dual circulating means comprising a first portion arranged to circulate a first cooling medium and a second portion arranged to circulate a second cooling medium, said cooling means of such character as to absorb heat within adjacent ranges of temperature, a heat absorber incorporated in each portion, an exchanger common to said portions for transferring accumulated heat from said second cooling medium to said first cooling medium, and a heat dissipating means incorporated in said first cooling medium, a first storage tank for said first cooling medium disposed in the path of circulation thereof, a second storage tank for said second cooling medium forming a blind end out of the path of circulation of said second cooling medium, and disposed so that the liquefied portion of said second cooling medium is forced therein by pressure created upon evaporation of a portion of said second medium when said circulating means is stopped, said second storage tank disposed in a bath of said first cooling medium.

4. In a cooling apparatus, a dual circulating means comprising a first portion arranged to circulate a first cooling medium and a second portion arranged to circulate a second cooling medium, said cooling means of such character as to absorb heat within adjacent ranges of temperature, a heat absorber incorporated in each portion, an exchanger common to said portions for transferring accumulated heat from said second cooling medium to said first cooling medium, a heat dissipating means incorporated in said first cooling medium, a compressor incorporated in said second portion for compressing said second cooling medium, and an automatic valve controlled means for bypassing a portion of the compressed cooling medium from the discharge to the intake side of said compressor and maintaining a predetermined suction pressure at the intake side of said compressor.

5. In a cooling apparatus, a dual circulating means comprising a first portion arranged to circulate a first cooling medium and a second portion arranged to circulate a second cooling medium, said cooling means of such character as to absorb heat within adjacent ranges of temperature, a heat absorber incorporated in each portion, an exchanger common to said portions for transferring accumulated heat from said second cooling medium to said first cooling medium, a heat dissipating means incorporated in said first cooling medium, said second portion further including, a compressor for compressing said second cooling medium from a gaseous to a liquid state, float controlled means tending to maintain the liquid level of said cooling medium above the heat absorber therefor whereby said second cooling medium tends to fill said heat absorber, a separator housing for said means, a baffle dividing said housing into a first chamber communicating through said float controlled means to said compressor and a second chamber connected with said heat absorber, said chambers being in intercommunication at the upper and lower sides of said baffle, an oil collecting means associated with the upper portion of said baffle, and a gaseous refrigerant tube disposed contiguous to said oil collecting means and communicating with the intake of said compressor.

6. In a cooling apparatus, a casing, including an air intake and an air outlet, a chilling unit projecting laterally from said casing and including a water supplied portion and a refrigerant supplied portion, said portions arranged to permit the flow of a liquid first over said water supplied portion then over said refrigerant supplied portion, a water circulating means arranged to supply water to said chilling unit and including a water cooling device disposed in said casing between the inlet and outlet thereof, a refrigerating means arranged to supply a refrigerant to said chilling unit, a heat exchanger including a portion incorporated in said refrigerating means and a portion incorporated in said water circulating means between said chilling unit and water cooling device.

7. In a cooling apparatus, a casing, including an air intake and an air outlet, a chilling unit projecting laterally from said casing and including a water supplied portion and a refrigerant supplied portion, said portions arranged to permit the flow of a liquid first over said water supplied portion then over said refrigerant supplied portion, a water circulating means arranged to supply water to said chilling unit and including a water cooling device disposed in said casing between the inlet and outlet thereof, a water storage tank arranged to receive water from said water cooling device, a refrigerating means arranged to supply a refrigerant to said chilling unit, including, a refrigerant cooling element disposed in the water circulating means between said chilling unit and said water cooling device, a receiver disposed in said water storage tank, and means communicating between said receiver and said chilling unit.

8. In a cooling apparatus employing refrigerant containing a lubricant, an evaporator means, a separator chamber in communication with the upper side of the evaporator means, a lubricant and gaseous refrigerant collecting means associated with said separator chamber at its upper portion, a source of liquid refrigerant, a control valve for controlling the supply of liquid refrigerant to said evaporator means and separator chamber, said control valve normally maintaining the liquid level in the separator chamber above the evaporator means, a drain conduit communicating with the evaporator means and separator chamber, and a refrigerant storage tank connected by its lower side to the extremity of the drain conduit, said storage tank having a capacity sufficient to receive all the liquid refrigerant from the evaporator means, separator chamber and source of liquid refrigerant, said separator chamber having sufficient capacity above its normal liquid level and below the collecting means to receive excess refrigerant delivered by said source upon draining of said separator chamber and subsequent refilling thereof from said storage chamber.

9. In a cooling apparatus employing refrigerant containing a lubricant, an evaporator means, a separator chamber in communication with the upper side of the evaporator means, a lubricant and gaseous refrigerant collecting means associated with said separator chamber at its upper portion, a source of liquid refrigerant, a control valve for controlling the supply of liquid refrigerant to said evaporator means and separator chamber, said control valve normally maintaining the liquid level in the separator chamber above the evaporator means, a drain conduit communicating with the evaporator means and separator chamber, a refrigerant storage tank connected by its lower side to the extremity of the drain conduit, said storage tank having a capacity sufficient to receive all the liquid refrigerant from the evaporator means, separator chamber and source of liquid refrigerant, said separator chamber having sufficient capacity above its normal liquid level and below the collecting means to receive excess refrigerant delivered by said source upon draining of said separator chamber and subsequent refilling thereof from said storage chamber, and a source of gaseous refrigerant and an equalizer means interposed between the separator chamber and source of liquid refrigerant independently of said control valve to minimize the flow of liquid refrigerant through said control valve upon draining of said separator chamber.

10. In a cooling apparatus, an evaporator means, a separator chamber in communication with the upper side of the evaporator means, a compressor and receiver therefor, a pressure reduction valve interposed between the receiver and separator chamber arranged to supply liquid refrigerant thereto, control means associated with the pressure reduction valve to maintain the liquid refrigerant level therein above the evaporator means, a bypass valve means interposed between the receiver and separator chamber independently of said pressure reduction valve, and pressure responsive means controlling said bypass valve means to maintain a predetermined minimum pressure in said evaporator means.

11. In a cooling apparatus, an evaporator means, a separator chamber in communication with the upper side of the evaporator means, a compressor and receiver therefor, a control valve for controlling the supply of liquid refrigerant to said evaporator means and separator chamber, said control valve normally maintaining the liquid level in the separator chamber above the evaporator means, a drain conduit communicating with the evaporator means and separator chamber, a refrigerant storage tank connected by its lower side to the extremity of the drain conduit, said storage tank having a capacity sufficient to receive all the liquid refrigerant from the evaporator means, separator chamber and source of liquid refrigerant, an equalizer means interposed between the separator chamber and receiver, independently of said control valve, to minimize the flow of liquid refrigerant through said control valve upon draining of said separator chamber, and a shut-off valve interposed between said compressor and separator chamber.

HENRY E. von SEGGERN.
ERNEST A. von SEGGERN.